Aug. 13, 1963

A. CHAUSSON 3,100,386

EVAPORATION HEAT EXCHANGER

Filed July 28, 1960

INVENTOR
ANDRÉ CHAUSSON 3,100,386
EVAPORATION HEAT EXCHANGER
André Chausson, Asnieres, France, assignor to Societe Anonyme des Usines Chausson, Asnieres, France, a company of France
Filed July 28, 1960, Ser. No. 45,961
Claims priority, application France June 29, 1959
5 Claims. (Cl. 62—467)

Aircraft and appliances flying at high speed, comprise certain parts and more particularly pilot cabins, electronic apparatus compartments, etc. which it is necessary to maintain at a given temperature.

The adiabatic heating of the external air caused by the high speed of aircraft or appliances prevents this surrounding air from being utilized as a medium capable of directly absorbing the excess heat to be evacuated. It is thus necessary to have recourse to an independent refrigerating source.

The cooling of a fluid, whether gaseous or liquid, in an evaporation heat exchanger provides the desired solution in many cases.

In these apparatuses, the fluid to be cooled is made to pass through ducts provided for this purpose, whose exchange surface is bathed by a liquid which is raised to boiling point. In this way, the liquid absorbs a quantity of heat corresponding to its latent vaporising heat. The kind of liquid and the pressure caused to prevail in the container holding it determines the boiling temperature and consequently the temperature variation of the cooling fluid which thus becomes independent of the flying speed and surrounding temperature resulting therefrom.

Up till now, two principal types of evaporator have existed:

(1) The simple evaporator essentially consisting of a container holding all or part of a liquid load to be evaporated and which is put into communication with the air into which it gives off steam and where the pressure prevails for which the working of the apparatus is devised. This container is traversed, in the part containing the volatile fluid, by channels in which the cooled fluid circulates.

The principal disadvantage of this type of evaporator is that during the maneuvers of the aircraft the circulation tubes, which form the walls of the circulation channels, emerge from the liquid according to the slope assumed by the free level of the latter. This means that the efficiency of the apparatus diminishes according to the extent that the tubes project in relation to the liquid. It is obvious that evaporators of this kind cannot normally be used when the aircraft or appliance is flying upside down.

To obviate this disadvantage, it is possible to construct evaporators with super-abundant exchange surfaces and so arranged that the part of these surfaces which remains immersed, whatever the slope of the evaporator, constantly ensures the thermometric output sought. This palliative leads to considerable weight and space required, and great complication of the cooled fluid circuit.

(2) The evaporating liquid circulation evaporator, essentially formed by an exchanger element of the conventional type, in which the transfer of heat takes place between the cooled fluid and the coolant liquid, which is directed, on leaving the exchanger, into a container holding all or part of the liquid load to be evaporated. This container is put into communication with the air into which it gives off steam and where the pressure prevails for which the working of the apparatus is planned.

This arrangement, as compared with the simple evaporator described above, has the advantage of being able to operate with its maximum thermometric output under all conditions, including upside down flying. It requires an electro-pump unit with its disadvantages arising out of weight, space required, power consumed and the risks of damage as with any mobile, electric or mechanical member.

The characteristic common to both these types of evaporators is the necessary existence of a free evaporation surface for the volatile liquid, which requires special provisions to avoid any loss of liquid during the maneuvers of the aircraft or appliance.

The present invention creates a new evaporation exchanger which eliminates the disadvantages mentioned above, while combining the particular advantages of these two types of evaporators.

According to the invention, the heat evaporation exchanger comprises a casing communicating with the air so that at least part of the surface of a load of porous material, containing a volatile liquid and completely enclosing an exchanger nest in which a fluid to be cooled circulates, is constantly at the prevailing atmospheric pressure, so that the liquid contained by the load and heated up by the circulation of the fluid to be cooled is subjected to at least a partial evaporation causing certain parts of said permeable load to swell thus causing a circulation of the liquid that it contains, which is directed against the exchange surfaces of the nest until complete evaporation has taken place.

As can be seen from the foregoing, the particular achievement of the device of the invention is the suppression the free liquid surface which makes it possible to use the evaporator in all positions without loss of liquid through the steam discharge opening.

Moreover, whatever the positions of the device, the thermometric output remains appreciably constant.

This result is obtained without it being necessary to apply the separation of the two heat exchange and evaporation processes, as is the case for circulation evaporators, whose electro-pump and its accessories (channels, non-return clack-valves, overpressure valve, etc.) are not used in the present invention.

The porous material for storing the evaporating liquid in the body of the evaporator is selected, according to one characteristic of the invention, so that it has no chemical action on the liquid which must be preserved without change of nature or state. Actually, according to the invention, this liquid must be extracted from the storing material without the intervention of a chemical process, the vaporising effect on the exchange surfaces alone causing the renewal of the liquid on these surfaces. The reverse movements of giving off steam and the intake of liquid on the heating surface take place in a natural manner. Obviously it is possible, if so required, according to the invention, to includes mechanical devices for activating the circulation of the liquid and steam.

It has been noticed that the porous material holding the volatile liquid must be a material possessing a stable structure, not affected by impacts, vibrations, temperature effects, and distortions resulting from successive humidification and drying, as well as the freezing effects of the stored liquid.

Furthermore, the dimensions of the pores, cells, or spaces, must allow of a large proportion of liquid to be absorbed and ensure, at the moment of working, an output enabling the fluid consumption which corresponds to the required thermometric output.

Moreover, and for certain applications, this porous material must possess a high electric resistivity and dielectric constant and it is obvious that the volatile liquids to be used in these particular applications must also have similar properties.

It has been noticed that it is advantageous, according to the invention, to form the porous material load of glass fibres of different qualities and various diameters. These fibres may be discontinuous fibres of various respective lengths or continuous fibres thus delimiting distinct layers. The nature of a porous load of this kind is such that its capillarity enables the absorption of the liquid and its retention in the mass without risk of loss by upsetting the container in which said porous load is placed.

The diameters of the fibres used fix the dimensions of the space which influences the output obtained when the liquid is extracted by evaporation.

The movements of steam and liquid in the mass take place naturally in the material. Actually, the space occupied by the dry material is greater than that occupied by the impregnated material. In this way, the areas dried by the action of the heating surfaces thus exert a pressure on the areas that are still damp, which has the effect of driving the liquid towards the dried areas.

Although the device according to the invention is principally intended to be used, as explained above, in aircraft, appliances and various flying machines, it is obvious that an evaporation heat exchanger device of this kind can have numerous other applications. In effect, it is possible for various objects to be cooled directly, without an intermadiary agent such as the cooled fluid normally circulating through the exchanger nest. Actually, certain equipments and appliances comprised by contrivances such as rockets, and in particular electronic apparatuses, can advantageously be placed in an airtight casing to which these appliances transmit the heat to be evacuated and this casing is, for example, placed inside the casing of the evaporator which contains the charge of porous material retaining the volatile liquid. In certain cases, the member to be cooled can be so devised as to be placed directly inside the body of the evaporator and thus placed in contact with the absorbent porous materials and the evaporating liquid.

Other applications can also be considered, and in particular, the cooling of heat engines in which the casing would consist of jackets surrounding the cylinders and containing the load of absorbent material and volatile liquid.

Another application consists of cooling the brakes of aircraft landing gear. The brake drums can be provided with a lining of absorbent material impregnated with liquid or in communication with a liquid tank, the impregnating of the absorbent material being, in this case, effected, for example, at the moment when the landing gear is put down.

Numerous other applications can also be contemplated without going outside of the scope of the invention, and methods of execution of the same are given, by way of examples, in the detailed description which follows.

Figure 1:
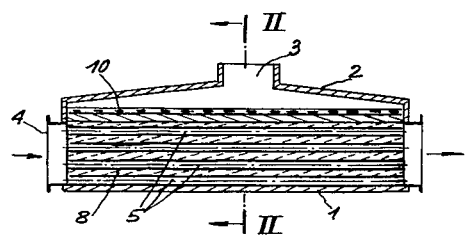
FIGURE 1 is a diagrammatical elevation-section of one embodiment an evaporation exchanger according to the invention.

In the drawing, the device comprises a cover 1 having, for example, the shape of a casing whose top 2 delimits a nozzle 3 for communicating the interior of this casing with the air. This casing contains a nest 4 formed by tubes 5 in which the fluid to be cooled circulates, which fluid may be gaseous or liquid. The tubes 5 of the nest 4 which project outside of the casing 1 of the exchanger, can be formed in many different ways and more particularly may be cylindrical or flat tubes.

Figure 3:
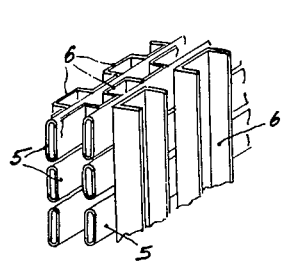
FIGURE 3 is a diagrammatical perspective, on a larger scale, of part of an exchanger nest of the device.

The arrangement of the tubes in the nest can be of any kind, and these tubes, which form a direct heat exchange surface, can be connected to each other by gills 6 (FIGURE 3) forming indirect exchange surfaces.

Figure 4:
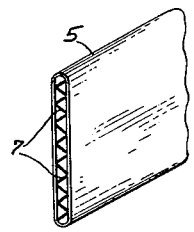
FIGURE 4 is a partial diagrammatical perspective, on a larger scale, of a tube of the exchanger nest produced by a particular method.

Likewise, as shown in FIGURE 4, the tubes can be provided internally with strips 7 providing indirect exchange surfaces for the coolant fluid. The indirect exchange surfaces formed by the insets 7 placed inside the tubes, or the gills 6 placed outside and between these tubes effectively increase the transmission coefficient applied to the direct exchange surface formed by the walls of the circulation tubes 5.

The casing 1 contains a load of spongy or fibrous material 8 formed of thin fibers or tubes of very small section, by felt or any other suitable material which will be described in detail hereafter.

This material, which is intended to retain a liquid to be evaporated, completely surrounds the tubes and gills outside of the nest, so that the liquid is always brought into contact with said direct or indirect exchange surfaces of the nest so long as the liquid impregnates the material 8. The course taken, or movement of the liquid absorbed by this material, which liquid evaporates when brought into contact in certain conditions with the exchange surfaces of the nest, can be directed in a particular manner by the selection and arrangement of said gills 6 whose shape and distribution can be chosen for delimiting preferential circulation courses of the liquid inside the casing.

The shape and dimensions of the casing 1 are determined so that this casing contains a suitable quantity of absorbent material for ensuring the storage of a selected liquid volume. The absorbent material can be entirely of a uniform nature and thus have identical physical properties throughout its entire mass. On the other hand, it can be made of several parts which have different physical properties, in order to create, for example, in certain parts of the casing, areas more particularly reserved for storing the liquid, and in other parts, areas for ensuring the extraction of the liquid from the preceding areas and to direct it towards the exchange surfaces.

Figure 5:
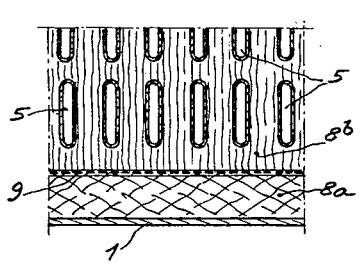
FIGURE 5 is a diagrammatical view showing a particular characteristic of the invention.

An arrangement of this kind is shown in FIGURE 5, according to which a cushion 8a of material for storing liquid is placed in the casing 1, this cushion being made, for example, of felt, and this felt possibly separated by a permeable partition 9 from a mass of material 8b formed by fibres that can be woven or plaited and which surround and assume the shapes of the tubes of the nest.

This method of execution is only an example, for the variety and arrangement of the materials of different properties depends on the dimensions of the casing, the distribution of the exchange surfaces in the mass and the evaporating power to be obtained, and consequently, the relative arrangement of the various materials acting for retaining a liquid must be determined by computation for each particular type of apparatus.

A general arrangement, which has been found to be advantageous, consists of creating storage areas in the parts of the apparatus which are the farthest removed from the exchange surfaces, as shown in FIGURE 5 according to which the material 8a which is felt, has no preferential direction for the flow of the liquid.

In contact with the storage area delimited by the material 8a, distinct beds or layers can be arranged, possibly separated from each other, which are respectively formed of continuous fibres thus having a preferential direction for the flow of the liquid. In addition to this general arrangement shown, it is possible to use different qualities of materials, selected more particularly in relation to the diameters and lengths of fibres, and to arrange them in the various parts of the casing for ensuring a supply of liquid to the exchange surfaces in ratio to the evaporating power to be obtained at each point of these surfaces (greater flow of liquids on the more active surfaces on the intake side of hot fluid, for example).

The selection of the materials is so determined that the parts of these materials which tend to become dried swell for exerting a pressure on the undried parts, and consequently, it is necessary that the arrangement of the materials inside the casing and between the elements forming the exchanger nest 4, are such that the material can freely swell and shrink. On the other hand, the parts externally limiting the mass of material are non-distortable. The material mass can be limited, for example, and in particular by the area of the casing reserved for the steam exit, by a perforated grid 10 which keeps the material in position. Likewise, it is advantageous to cover the material mass with one or more plates 11, FIGURE 6, of sintered material and more particularly sintered glass of great permeability.

When the evaporating device described above is to be used on an aeroplane, it is essential that the device contains no more liquid to be evaporated than required for its proper working and corresponding to the quantity that can be absorbed by the absorbent material within the casing. Any excess filling entails the carrying of a useless weight of liquid which would be thrown out during the maneuvers of the aeroplane, and consequently, would result in losses of liquid which might be harmful and sometimes dangerous in the case of particular liquids.

Figure 6:
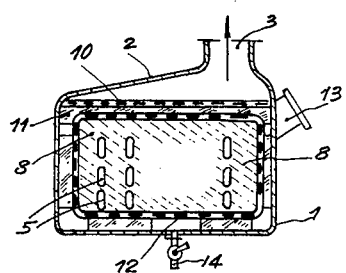
FIGURE 6 is a diagrammatical cross-section, similar to FIGURE 2, showing an alternative embodiment.

In order that a suitable quantity of liquid is loaded, it is advantageous to proceed as shown in FIGURE 6. In this figure, the mass of absorbent material 8 is placed in an internal casing 12 which extends over all the faces, or only over certain faces of the appliance, at a few millimetres from the external casing 1. The internal casing or part of it, is perforated, while remaining undistortable.

When filling through a nozzle 13, the liquid is introduced in a sufficient quantity to fill the whole of the container available for it. The liquid which is not absorbed by the material 8 remains in the vacant space comprised between the two casings and is then evacuated through a discharge duct 14 provided for this purpose.

The evaporating device then contains evaporant liquid only in the quantity corresponding to the absorbing capacity of the material 8 without risk of subsequent loss.

Figure 2:
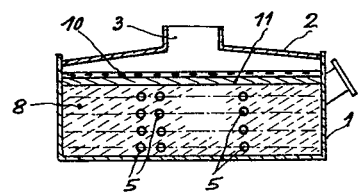
FIGURE 2 is a section taken along the line II—II of FIGURE 1.

The space comprised between the two casings 1 and 12 being in communication with the air by the nozzle 3, the active evaporating surface corresponds to the total free surface of the internal casing 12. This arrangement is particularly advantageous and enables a distribution of exchange surfaces and a distribution of materials of varied qualities in a manner different from that of the evaporator described with reference to FIGURES 1 and 2. It is possible to provide numerous alternatives of the embodiments shown and in particular it is possible to place in the nest or outside the nest 4, but inside the material 8, one or more chimneys having perforated walls which enable the evaporation surface to be increased.

In addition to what has already been stated above, it is indispensable that the absorbent materials be chosen from among those that permanently retain their geometrical properties, as the dimensions of the capillary spaces regulate the absorbing and releasing of the evaporant or cooling liquid. This liquid must be such that it leaves no deposit of any kind at the moment of its evaporation or by simply flowing through the absorbent material.

All the liquids capable of being treated for affording the qualities stated above are utilisable in the device of the invention and in particular pure distilled waters, distilled waters with the addition of a liquid modifying boiling temperature, alcohols, such as isopropylic, ethylic, methylic alcohols as well as ethers, may be used.

I claim:

1. An evaporation heat exchanger for an airplane or the like flying at high speed and altitude, comprising a casing to be located inside said airplane, said casing having a nozzle for communication of the inside of the casing with the atmosphere outside the airplane, a nest of tubes extending through said casing for circulating a fluid other than ambient air to be cooled, at least one charge of fiber material embedding said nest of tubes and capable of being impregnated with a volatile liquid coolant, said fiber material being disposed in channel members extending in predetermined directions to compel a coolant impregnating said charge of fiber material toward said tubes for heating the coolant to a temperature higher than its boiling temperature by heat exchange with said fluid circulated inside the nest of tubes, and means including a porous partition positioned between the charge of fiber material and said nozzle and engaging said charge to hold the charge in place, said partition being of a selected porosity to regulate the area of said charge of fiber material directly in communication with the atmosphere.

2. An evaporation heat exchanger as set forth in claim 1 in which the charge of fiber material embedding said nest of tubes is made of glass fiber, said charge being maintained in place by means of a plurality of porous rigid partitions, and a further charge of different porous material having good storing properties for the volatile liquid surrounding at least in part said charge embedding said nest of tubes.

3. An evaporation heat exchanger for an airplane or the like flying at high speed and altitude, comprising a first casing of impervious material, a nozzle to make the inside of said casing in communication with the atmosphere surrounding an airplane provided with said evaporation heat exchanger, a second casing of porous but rigid material located inside said first casing, members interposed between said first and second casings to define a narrow peripheral recess completely about said second casing, a partition of sintered material interposed between said second casing and said nozzle of the first casing, a nest of tubes extending through said first and second casing for circulating a fluid to be cooled, at least one charge of fiber material embedding said nest of tubes and filling completely said second casing, said fiber material extending in directions determined to compel a volatile liquid impregnating said charge of fiber material to follow a predetermined path when heated by said fluid circulated inside the nest of tubes to a temperature higher than its boiling temperature.

4. An evaporation heat exchanger comprising a first casing of impervious material, a nozzle in said casing in communication with the atmosphere surrounding the casing, a second casing of porous but rigid material located inside said first casing, members interposed between said first and second casings to define a narrow peripheral recess completely about said second casing, a nest of tubes extending through said first and second casings for circulating a fluid to be cooled, at least one charge of absorbent material embedding said nest of tubes and within said second casing, said absorbent material extending in directions to compel a volatile liquid impregnating said charge toward said tubes for heating exchange with the fluid to be cooled.

5. A heat exchanger according to claim 4 wherein said first casing is provided with a fill nozzle for inserting the volatile coolant and a drain outlet for draining coolant not absorbed by said charge of absorbent material.

References Cited in the file of this patent

UNITED STATES PATENTS

| | | |
|---|---|---|
| 699,260 | Underwood | May 6, 1902 |
| 2,500,527 | Demuth | Mar. 14, 1950 |
| 2,655,795 | Dyer | Oct. 20, 1953 |
| 2,732,192 | Johnson | Jan. 24, 1956 |
| 2,941,759 | Rice | June 21, 1960 |
| 2,960,847 | Potter | Nov. 22, 1960 |